US007639653B2

(12) United States Patent
Casaccia (10) Patent No.: US 7,639,653 B2
(45) Date of Patent: Dec. 29, 2009

(54) METHOD AND APPARATUS FOR MANAGING UPLINK RESOURCE ALLOCATION IN A COMMUNICATION SYSTEM

(75) Inventor: Lorenzo Casaccia, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 11/372,940

(22) Filed: Mar. 9, 2006

(65) Prior Publication Data

US 2007/0014265 A1 Jan. 18, 2007

Related U.S. Application Data

(60) Provisional application No. 60/660,608, filed on Mar. 10, 2005.

(51) Int. Cl.
*H04Q 7/24* (2006.01)
(52) U.S. Cl. ......................... 370/337; 370/281; 370/347
(58) Field of Classification Search ....................... None
See application file for complete search history.

(56) References Cited

U.S. PATENT DOCUMENTS

| 6,501,745 | B1 * | 12/2002 | Turina et al. ................. 370/337 |
| 2002/0172163 | A1 * | 11/2002 | Chen et al. .................. 370/281 |
| 2003/0198199 | A1 | 10/2003 | Budka |

FOREIGN PATENT DOCUMENTS

| EP | 1005243 A | 5/2000 |
| EP | 1489869 A | 12/2004 |
| WO | WO 96022665 | 7/1996 |
| WO | WO 02017664 | 2/2002 |

OTHER PUBLICATIONS

Pecen, M. et al., "Simultaneous Voice and Data Operation for GPRS/EDGE: Class a dual transfer mode" IEEE Personal Communications, IEEE Communications Society, US, vol. 8, No. 2, Apr. 2001, pp. 14-29, XP002992040.
3GPP TS 45.002 V6.12.0: "3rd Generation Partnership Project; Technical Specification Group GSM/EDGE Radio Access Network; Multiplexing and multiple access on the radio path (Release 6)," pp. 1-92 (Nov. 2005).

(Continued)

*Primary Examiner*—Erika A Gary
(74) *Attorney, Agent, or Firm*—Rupit M. Patel (57) ABSTRACT

A method and apparatus resolves conflicts and ambiguities of GSM standards arising in DTM by monitoring only selected downlink timeslots for uplink status flags (USFs). Downlink timeslots with a packet data channel (PDCH) are monitored for a USF from a lowest numbered time slot, B(0), to a maximum time slot B(MAX) where B(MAX) is equal to the lowest transmission uplink timeslot, B(x), in the corresponding TDMA uplink frame if the second lowest transmission uplink timeslot B(x)+1, is a circuit switched timeslot and where B(MAX) is equal to the second lowest transmission timeslot in the corresponding TDMA frame, B(x)+1, otherwise.

17 Claims, 8 Drawing Sheets

OTHER PUBLICATIONS

3GPP TS 43.055 V6.12.0: "3rd Generation Partnership Project; Technical Specification Group GSM/EDGE Radio Access Network; Dual Transfer Mode (DTM); Stage 2 (Release 6)," pp. 1-36 (Nov. 2005).

"3GPP TS 44.060 V5.18.0: "'3rd Generation Partnership Project; Technical Specification Group GSM/EDGE Radio Access Network; General Packet Radio Service (GPRS); Mobile Station (MS) — Base Station System (BSS) Interface; Radio Link Control/Medium Access Control (RLC/MAC) protocol (Release 5," "pp. 1-342 (Nov. 2005)".

International Search Report, PCT/US2006/008765 — International Search Authority — European Patent Office, Jul. 25, 2006.

International Preliminary Report on Patentability, PCT/US2006/008765 — The International Bureau of WIPO — Geneva, Switzerland, Sep. 12, 2007.

Written Opinion, PCT/US2006/008765 — International Search Authority — European Patent Office, Jul. 25, 2006.

\* cited by examiner

METHOD AND APPARATUS FOR MANAGING UPLINK RESOURCE ALLOCATION IN A COMMUNICATION SYSTEM

CLAIM OF PRIORITY UNDER 35 U.S.C. §119

The present application for patent claims priority to Provisional Application Ser. No. 60/660,608, entitled Method and Apparatus for Monitoring in a Wireless Communications Systems, filed Mar. 10, 2005, and assigned to the assignee hereof and hereby expressly incorporated by reference herein.

BACKGROUND

1. Field

The present invention relates generally to cellular communication systems, and more specifically, to a method and apparatus for managing uplink resource allocation in a communication system.

2. Background

Global System for Mobile Communication (GSM) cellular communication systems provide communication services to mobile and portable devices through an arrangement of base stations. In GSM systems, frames of timeslots and radio blocks are transmitted and received at the mobile station using time division multiplexing. GSM systems have evolved from providing strictly voice services to also providing data services. Standards such as general packet radio service (GPRS) and Enhanced Data fro Global Evolution (EDGE) further define the protocols for data communication within GSM based systems. The access terminals, also sometimes referred to as mobile devices, portable devices and by other names, are categorized into classes where the classes are at least partly based on the number of simultaneous timeslots that the access terminal can use in the uplink and the downlink directions. Multi-slot classes represent the capabilities of an access terminal to receive/transmit and process multiple timeslots of a frame. During Dual Transfer Mode (DTM), transmitted and received frames include circuit switched calls timeslots including information related to voice calls (or other circuit switched calls) and data timeslots that include information related to data. In conventional GSM EDGE Radio Access Network (GERAN) systems, access terminals categorized within some higher multi-slot classes can transmit and receive data as well as voice information using multiple timeslots within of frame.

Uplink Status uplink status flags (USFs) provide a mechanism for the base station to dynamically allocate uplink timeslots assigned to an access terminal. The USFs are transmitted in the downlink and identify the uplink timeslots that are authorized for use by the access terminal. A USF in a downlink timeslot indicates that the access terminal is authorized to transmit on the corresponding uplink timeslot in the next frame. GERAN specifications such as 3GPP TS 44.060, 3GPP TS 45.002 and 3GPP TS 43.055 attempt to define the downlink timeslots that should be monitored for USFs. Unfortunately, the GERAN specifications are ambiguous for some situations where DTM and High Multi-shot Classes are applied.

Therefore, there is need for an apparatus and method for monitoring uplink status flags in a GSM communication system.

SUMMARY

In accordance with the exemplary embodiment, an access terminal manages uplink status flags (USFs) in a Global System for Mobile Communication (GSM) communication system by monitoring for USFs in timeslots with assigned packet data channels (PDCHs) from a first downlink timeslot to a maximum numbered downlink timeslot within a downlink time division multiple access (TDMA) frame, wherein the maximum numbered downlink timeslot is a lowest numbered uplink transmission timeslot over which the access terminal will transmit on the corresponding uplink frame in a corresponding uplink TDMA frame if a second lowest numbered uplink timeslot over which the access terminal will transmit on the corresponding uplink frame is a circuit switched timeslot and wherein the maximum numbered downlink timeslot is one timeslot greater than the lowest numbered transmission timeslot over which the access terminal will transmit on the corresponding uplink frame, otherwise.

DETAILED DESCRIPTION

In accordance with the exemplary embodiment, a wireless access terminal efficiently utilizes processing resources by monitoring only selected uplink status flags (USFs) when in Dual Transfer Mode (DTM). Ambiguous rules reflected by the GSM Edge Radio Access Network (GERAN) specifications are resolved by monitoring assigned packet data channels (PDCHs) for USFs up to a maximum uplink timeslot, where the maximum uplink timeslot is equal to lowest numbered uplink timeslot over which the access terminal will transmit on the corresponding uplink frame if the second lowest uplink timeslot is a circuit switched timeslot and where the maximum downlink timeslot is one timeslot greater than the lowest numbered uplink timeslot over which the access terminal will transmit, otherwise. Therefore, if B(x) is the lowest numbered uplink transmission timeslot, the downlink timeslots with assigned PDCHs are monitored from timeslot B(0) to timeslot B(MAX) where B(MAX)=B(x) if the second lowest numbered timeslot, B(x)+1, is a circuit switched timeslot and where B(MAX)=B(X)+1, otherwise.

As referred to herein, a "transmission uplink timeslot" is an uplink timeslot over which the access terminal transmits. Accordingly, a transmission uplink timeslot is an allocated and assigned timeslot in an uplink TDMA frame. As discussed below, the TDMA frame has eight timeslots numbered from 0 to 7. The lowest numbered transmission uplink timeslot, therefore, is the first timeslot in the TDMA uplink frame that is used for transmission. The second lowest numbered uplink timeslot is one timeslot greater than the lowest numbered transmission uplink timeslot. The second lowest numbered uplink timeslot may be a transmission timeslot where the timeslot is allocated and assigned for data or voice transmission or may be assigned and not allocated or may not be assigned. Accordingly, the second lowest uplink timeslot may be a circuit switched timeslot in some cases.

Figure 1:
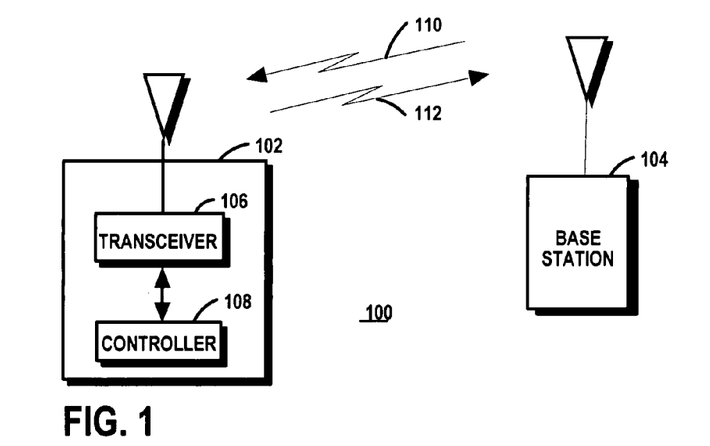
FIG. 1 is a block diagram of an access terminal communicating with a base station in accordance with the exemplary embodiment of the invention.

FIG. 1 is a block diagram of a Global System for Mobile Communication (GSM) communication system 100 in accordance with an exemplary embodiment of the invention. The word "exemplary" is used herein to mean "serving as an example, instance, or illustration." Any embodiment described herein as "exemplary", therefore, is not necessarily to be construed as preferred or advantageous over other embodiments. An arrangement of base stations 104 provides communication services to one or more access terminals 102. In the interest of brevity, a single base station 104 and a single access terminal 102 are illustrated in FIG. 1. The GSM communication system 100 operates in accordance with GSM and GSM enhanced data for global evolution (EDGE) radio access network (GERAN) specifications. In the exemplary embodiment, the GSM system 100 is capable of providing voice and/or data communication services to access terminals defined for 12 multi-slot classes. Multi-slot classes indicate the capabilities of an access terminal to transmit/receive and process multiple timeslots per frame. As described above, the current GERAN specification is ambiguous for a number of situations where DTM and High Multi-shot Classes are combined. Control and information signals are wirelessly transmitted between the base station 104 and the access terminals 102 where downlink signals are transmitted from the base station 104 to the access terminal 102 through a downlink wireless channel 110 and uplink signals are transmitted from the access terminal through an uplink wireless channel 112.

A transceiver 106 within the access terminal 102 transmits and receives electromagnetic signals through an antenna in accordance with the GSM standards. The transceiver 106, therefore, modulates, demodulates, filters and otherwise processes the signals to enable communication between the access terminal 102 and the base station 104. A controller 108 in the access terminal 102 controls the transceiver 106 as well as performing other functions including managing the overall functionality of the access terminal 102. The controller 108 is any combination of processors, microprocessors, processor arrangements, computers, logical gates, application specific integrated circuits (ASICs), programmable logic circuits, and/or computing circuits. The controller 108 may include other hardware such as digital to analog (D/A) circuits, for example. Software running on the controller 108 performs the functions described herein as well as calculations and other device management and communication tasks.

In the exemplary embodiment, the access terminal 102 includes other hardware, software, and firmware not shown in FIG. 1 for facilitating and performing the functions of an access terminal 102. For example, the access terminal 102 includes input and output devices such as keypads, displays, microphones and speakers. Further, the functions and operations of the blocks of the access terminal 102 may be implemented in any number of devices, circuits, or elements. Two or more of the functional blocks may be integrated in a single device and the functions described as performed in any single device may be implemented over several devices. For example, portions of the controller 108 may perform some of the functions of the transceiver 106 in some circumstances.

Figure 2:
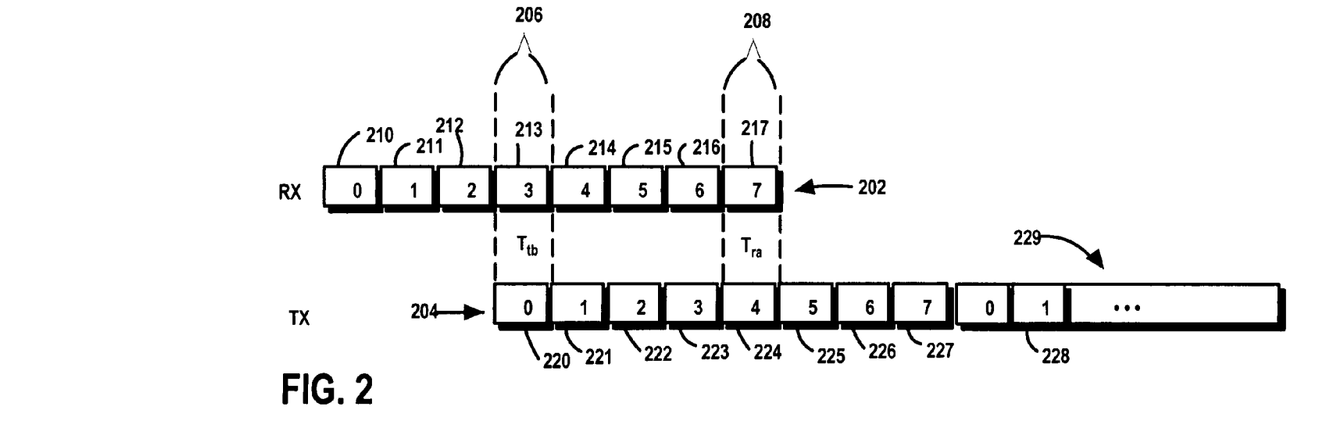
FIG. 2 is a block diagram of an uplink frame and a downlink frame in accordance with an exemplary timeslot configuration.

FIG. 2 is a block diagram of a TDMA downlink frame 202 and a TDMA uplink frame in accordance with GSM communication standards. The TDMA downlink frame is transmitted through the downlink wireless channel 110 from a base station 104 to one or more access terminals 102. The TDMA downlink frame includes eight downlink timeslots (210-217) including downlink timeslot (0) 210, downlink timeslot (1) 211, downlink timeslot (2) 212, downlink timeslot (3) 213, downlink timeslot (4) 214, downlink timeslot (5) 214, downlink timeslot (6) 216, and downlink timeslot (7) 217. A series of downlink frames are transmitted from the base station 104. Accordingly, only a single frame portion of the downlink series of downlink timeslots is shown in FIG. 2. The uplink TDMA frame 204 includes eight uplink timeslots (220-227) including uplink timeslot (0) 220, uplink timeslot (1) 221, uplink timeslot (2) 222, uplink timeslot (3) 223, uplink timeslot (4) 224, uplink timeslot (5) 224, uplink timeslot (6) 226, and uplink timeslot (7) 227. The uplink TDMA frame 204 is transmitted from the access terminal 102 through the uplink wireless channel 112. Since the access terminal 102 operates in accordance with half duplex techniques, the uplink TDMA frame 204 is transmitted at an offset from the downlink TDMA frame 202. In FIG. 2, the offset is shown as three timeslots. Accordingly, the first uplink timeslot (uplink timeslot (0)) 220 of the uplink TDMA frame 204 coincides with downlink timeslot (3) 213 in the exemplary block diagram. The uplink frame 204 and downlink frame 202 are offset by 3 timeslots in GSM although the receive-to-transmit transition ($T_{tb}$) 206 and the transmit-to-receive transition ($T_{ra}$) 208 may have different positions. During the receive-to-transmit transition ($T_{tb}$) 206 and the transmit-to-receive transition ($T_{ra}$) 208, the access terminal does not transmit or receive uplink or downlink timeslots. Although $T_{tb}$ and $T_{ra}$ are shown as having lengths of a single timeslot, the transitions 206, 208 may have different values in some circumstances.

The access terminal 102 monitors the downlink packet data channels (PDCH) for uplink status flags (USFs) to identify the uplink timeslots that are authorized for use by the access terminal 102. As is known, the USFs provide a mechanism for dynamically managing uplink resources. A USF in a downlink timeslot indicates that the access terminal 102 is authorized to transmit on the corresponding uplink timeslot for the next radio block where a radio block is equal to four frames. Accordingly, a USF in downlink timeslot (1) 211 indicates that the access terminal should transmit on the uplink timeslot (1) 228 of the next frame 229 where the next frame 229 belongs to a different radio block.

In the exemplary embodiment, the software running on the controller 108 determines which downlink timeslots to monitor based on the allocated (authorized) transmission uplink timeslots within the current uplink frame 204 and the duration and offset of the receive-to-transmit and transmit-to-receive transitions 206, 208. The access terminal 102 monitors PDCH downlink timeslots for USFs from a first downlink timeslot (210) to a maximum numbered downlink timeslot within a downlink frame 202 where the maximum numbered downlink timeslot is one timeslot greater than the lowest numbered transmission timeslot on the corresponding uplink frame unless the second lowest uplink timeslot in the current uplink frame is a circuit switched timeslot. If the second lowest uplink timeslot in the current uplink frame is a circuit switched timeslot, the maximum number downlink timeslot is the lowest numbered transmission timeslot on the corresponding uplink frame. Therefore, the access terminal 102 monitors the USFs in the PDCH downlink timeslots from B(0) to B(x)+1 if the B(x)+1 uplink timeslot in the current uplink frame is not a circuit switched timeslot and from B(0) to B(x) if the B(x)+1 uplink timeslot is a circuit switched timeslot, where B(0) is the first timeslot 210, 220 in a frame 202, 204 and B(X) is one of the timeslots 210-217, 220-227 in a frame 202, 204.

Figure 3:
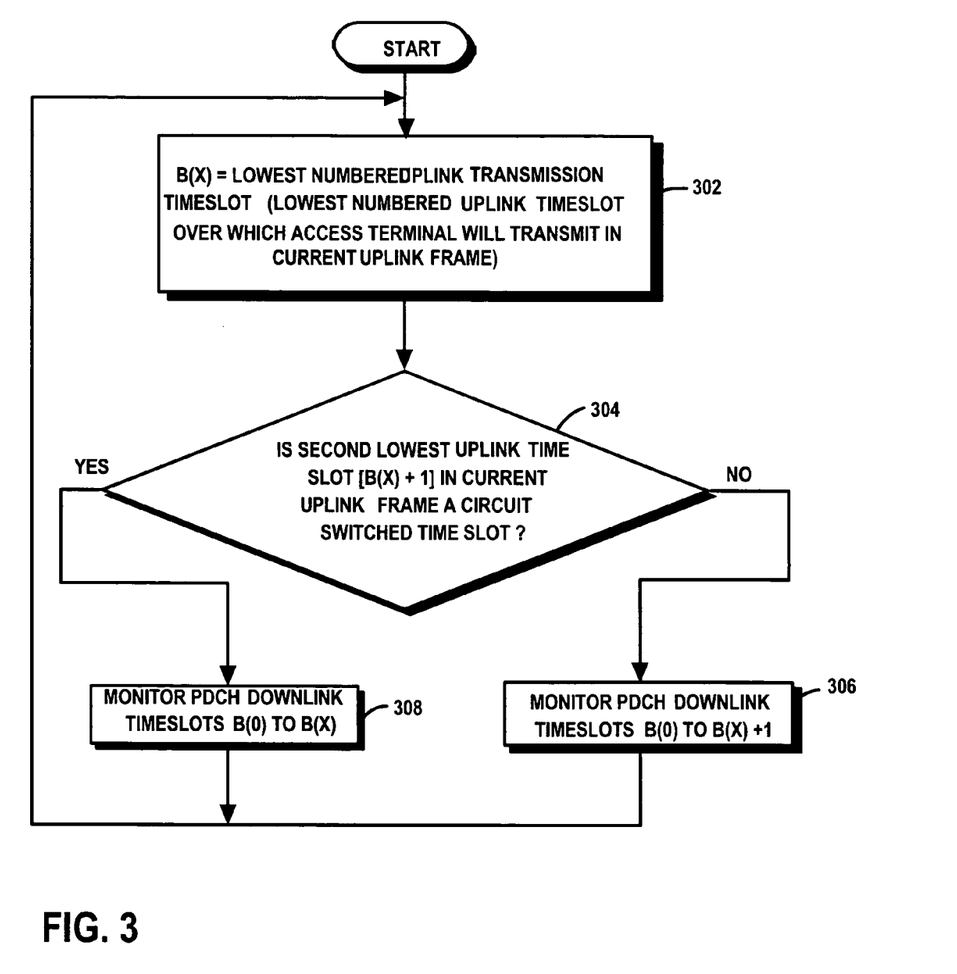
FIG. 3 is a flow chart of a method of monitoring uplink status flags (USFs) in a GSM communication system in accordance with the exemplary embodiment.

FIG. 3 is a flow chart of a method of monitoring downlink timeslots for USFs in the GSM communication system 100 in accordance with the exemplary embodiment.

At step 302, B(X) is set equal to the lowest numbered uplink transmission timeslot. B(X) is the lowest numbered uplink timeslot over which the access terminal 102 will transmit in the current uplink frame 204. Accordingly, the lowest numbered uplink timeslot is the lowest numbered timeslot in the current uplink frame 204 that has been allocated and authorized for uplink transmission.

At step 304, it is determined whether the second lowest uplink timeslot, B(X)+1, in the current uplink frame 204 is circuit switched timeslot. If the B(X)+1 uplink timeslot in the current uplink frame 204 is a circuit switched timeslot, the method continues at step 308. Otherwise, the method continues at step 306.

At step 306, PDCH downlink timeslots from B(0) to B(X)+1 are monitored for USFs. Accordingly, the highest numbered downlink timeslot (maximum uplink transmission timeslot) that is monitored for a USF is the downlink timeslot corresponding to one timeslot greater that the lowest numbered uplink timeslot that will be used for uplink transmission by the access terminal 102 (second lowest uplink time slot). The method returns to step 302 to continue monitoring timeslots in the next frame.

At step 308, PDCH downlink timeslots from B(0) to B(X) are monitored for USFs. Accordingly, the highest numbered downlink timeslot (maximum uplink transmission timeslot) where there USF is monitored is the lowest numbered uplink timeslot that will be used for uplink transmission by the access terminal 102. The method returns to step 302 to continue monitoring the next frame.

Figure 4:
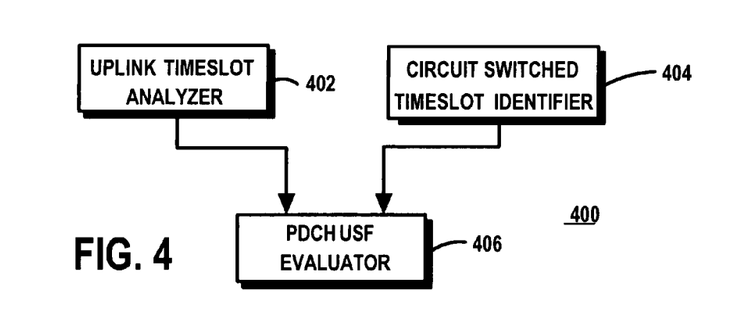
FIG. 4 is a block diagram of a USF monitor in accordance with the exemplary embodiment of the invention.

FIG. 4 is a block diagram of a USF monitor 400 in accordance with the exemplary embodiment of the invention. In the exemplary embodiment, the USF monitor 400 comprises executable code running on the controller 108 in the access terminal 102 to implement the functional blocks described in FIG. 4. The functional blocks described with reference to FIG. 4, however, may be implemented using any combination of hardware, software and/or firmware. Also, the functions and operations of the blocks described in FIG. 4 may be implemented in any number of devices, circuits, or infrastructure. Two or more of the functional blocks may be integrated in a single device and the functions described as performed in any single device may be implemented over several devices, software code, or software applications.

The USF monitor 400 includes an uplink timeslot analyzer 402, a circuit switched timeslot identifier 404, and a PDCH USF evaluator 406. The uplink timeslot analyzer 402 identifies the lowest numbered uplink timeslot (B(X)) in the current uplink frame authorized for transmission. The circuit switched timeslot identifier 404 determines which uplink timeslot in the current uplink frame 204 is a circuit switched timeslot. The PDCH evaluator 406 determines the highest downlink timeslot that will be monitored based on the lowest numbered authorized uplink timeslot and the circuit switched timeslot. The PDCH evaluator 406 monitors the PDCHs in the downlink timeslots from B(0) to B(X) if the B(X) uplink timeslot is a circuit switched timeslot and from B(0) to B(X)+1, otherwise.

FIG. 5 through FIG. 15 are block diagrams of uplink frames 204 and downlink frames 202 for eleven examples of timeslot configurations. In FIG. 5 through FIG. 15, circuit switched timeslots are illustrated as solid blocks, unallocated assigned timeslots are illustrated as single crosshatched blocks, allocated assigned timeslots are illustrated as double crosshatched blocks and unassigned blocks are illustrated as unfilled blocks. A timeslot where a PDCH is monitored for a USF is illustrated by a timeslot block overlaid with a monitor marker 502.

Figure 5:
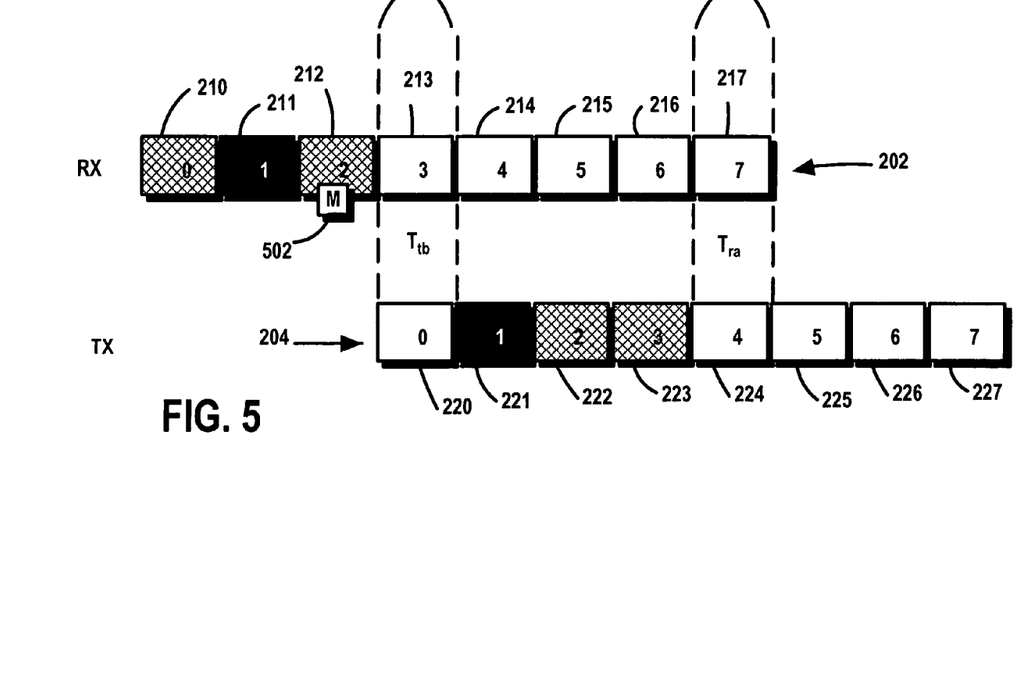
FIG. 5 is a block diagram of an uplink frame and a downlink frame for a first example where the second timeslot (timeslot 1) is a circuit switched timeslot.

FIG. 5 is a block diagram of an uplink frame 204 and a downlink frame 202 for a first example where the second timeslot (timeslot 1) is a circuit switched timeslot. In the first example, the first timeslot of the uplink frame 204 coincides with the fourth timeslot (timeslot 3) 213 of the downlink frame 202 and the reception-to-transmission transition occurs during the fourth timeslot (timeslot 3) 213 in the downlink frame 202. The lowest numbered timeslot where the access terminal will transmit during the corresponding uplink frame is the second timeslot (timeslot 1) 221. Therefore, the one timeslot greater than the lowest uplink transmission timeslot (second lowest uplink timeslot) is timeslot 2 212 (B(X)+1) =timeslot 2). In accordance with the exemplary monitoring technique, the assigned PDCH timeslots are monitored up to one timeslot greater than the lowest numbered transmission timeslot. Accordingly, applying the USF monitoring technique of the exemplary embodiment, the USF is monitored in the third timeslot (timeslot 2) 212.

Figure 6:
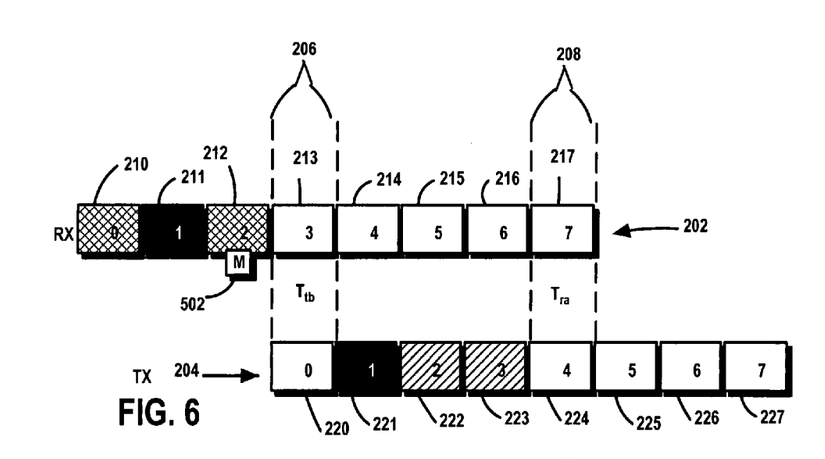
FIG. 6 is a block diagram of an uplink frame and a downlink frame for a second example where the second timeslot (timeslot 1) is a circuit switched timeslot.

FIG. 6 is a block diagram of an uplink frame 202 and a downlink frame 204 for a second example where the second timeslot (timeslot 1) is a circuit switched timeslot. In the second example, the first timeslot of the uplink frame 204 coincides with the fourth timeslot (timeslot 3) 213 of the downlink frame 202 and the reception-to-transmission transition occurs during the fourth timeslot (timeslot 3) 213 in the downlink frame 202. The lowest numbered timeslot where the access terminal will transmit during the corresponding uplink frame is the second timeslot (timeslot 1) 221. Therefore, the one timeslot greater than the lowest uplink transmission timeslot (second lowest uplink timeslot) is timeslot 2 212 (B(X)+1)=timeslot 2). In accordance with the exemplary monitoring technique the assigned PDCH timeslots are monitored up to one timeslot greater than the lowest numbered transmission timeslot. Accordingly, applying the USF monitoring technique of the exemplary embodiment, the USF is monitored in the third timeslot (timeslot 2) 212. As compared to the requirements of the current GERAN standard, the fourth downlink timeslot (timeslot 3) 213 is not monitored in the second example.

Figure 7:
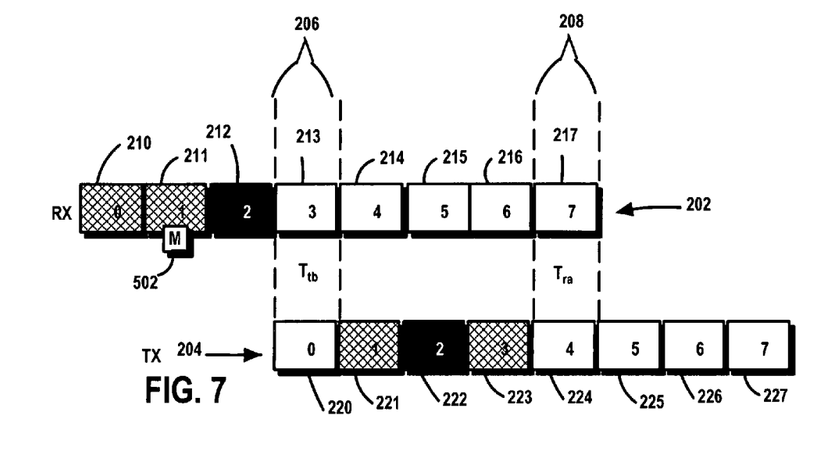
FIG. 7 is a block diagram of an uplink and downlink frames for a third example where the second timeslot (timeslot 1) is a circuit switched timeslot.

FIG. 7 is a block diagram of an uplink frame 204 and downlink frame 202 for a third example where the second timeslot (timeslot 1) 211 is a circuit switched timeslot. In the third example, the first timeslot of the uplink frame 204 coincides with the fourth timeslot (timeslot 3) 213 of the downlink frame 202 and the reception-to-transmission transition occurs during the fourth timeslot (timeslot 3) 213 in the downlink frame 202. The lowest numbered timeslot where the access terminal will transmit during the corresponding uplink frame 204 is the second timeslot (timeslot 1) 221. Therefore, the one timeslot greater than the lowest uplink transmission timeslot is timeslot 2 212 (B(X)+1)=timeslot 2). In accordance with the exemplary monitoring technique the assigned PDCH timeslots are monitored up to one timeslot greater than the lowest numbered transmission timeslot unless that timeslot is a circuit switched timeslot. Since the B(X)+1 timeslot is a circuit switched timeslot, however, the highest downlink PDCH timeslot where the USF is monitored is the second timeslot (timeslot 1) 211. Accordingly, applying the USF monitoring technique of the exemplary embodiment, the USF is monitored in the second timeslot (timeslot 1) 211.

Figure 8:
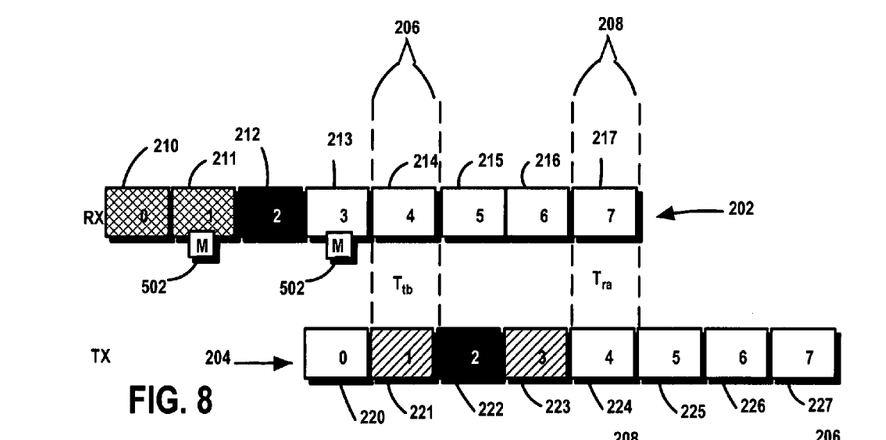
FIG. 8 is a block diagram of a uplink and downlink frames for a fourth example where the third timeslot (timeslot 2) is a circuit switched timeslot.

FIG. 8 is a block diagram of an uplink frame 204 and a downlink frame 202 for a fourth example where the third timeslot (timeslot 2) 212 is a circuit switched timeslot. In the fourth example, the first timeslot of the uplink frame 204 coincides with the fourth timeslot (timeslot 3) 213 of the downlink frame 202 and the reception-to-transmission transition occurs during the fifth timeslot (timeslot 4) 214 in the downlink frame 202. The lowest numbered timeslot where the access terminal will transmit during the corresponding uplink frame is the third timeslot (timeslot 2) 221. Therefore, the one timeslot greater than the lowest uplink transmission timeslot is timeslot 3 213 (B(X)+1)=timeslot 2). In accordance with the exemplary monitoring technique the assigned PDCH timeslots are monitored up to one timeslot greater than the lowest numbered transmission timeslot. Accordingly, applying the USF monitoring technique of the exemplary embodiment, the USF is monitored in the second timeslot (timeslot 1) and in the fourth timeslot (timeslot 3) 213.

Figure 9:
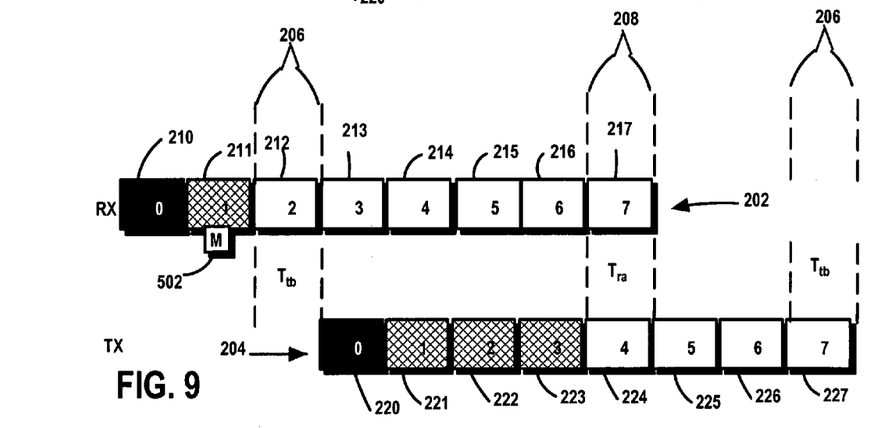
FIG. 9 is a block diagram of a uplink and downlink frames for a fifth example where the first timeslot (timeslot 0) is a circuit switched timeslot.

FIG. 9 is a block diagram of an uplink frame 204 and a downlink frame 202 for a fifth example where the first timeslot (timeslot 0) 210 is a circuit switched timeslot. In the fifth example, the first timeslot of the uplink frame 204 coincides with the fourth timeslot (timeslot 3) 213 of the downlink frame 202 and the reception-to-transmission transition occurs during the third timeslot (timeslot 2) 212 in the downlink frame 202. The lowest numbered timeslot where the access terminal will transmit during the corresponding uplink frame 204 is the first timeslot (timeslot 0) 220. Therefore, the one timeslot greater than the lowest uplink transmission timeslot is timeslot 1 211 (B(X)+1)=timeslot 1). In accordance with the exemplary monitoring technique, the assigned PDCH timeslots are monitored up to one timeslot greater than the lowest numbered transmission timeslot. Accordingly, applying the USF monitoring technique of the exemplary embodiment, the USF is monitored in the second timeslot (timeslot 1).

Figure 10:
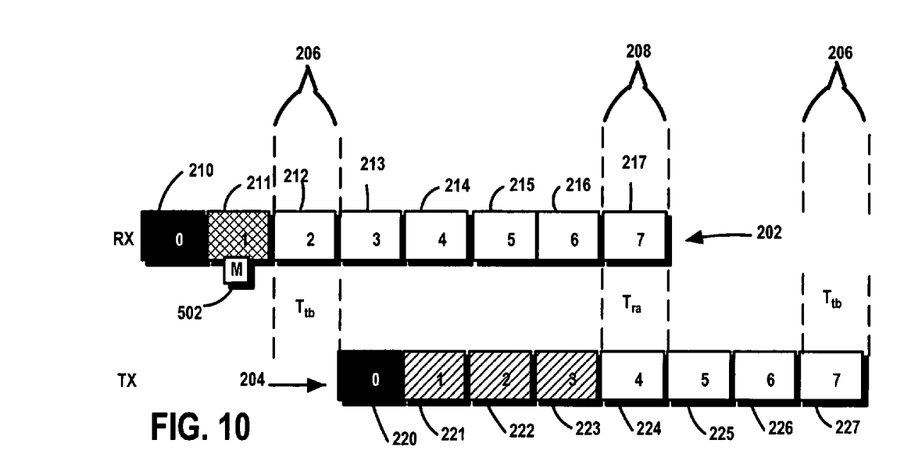
FIG. 10 is a block diagram of a uplink and downlink frames for a sixth example where the second timeslot (timeslot 1) is a circuit switched timeslot.

FIG. 10 is a block diagram of an uplink frame 204 and downlink frame 202 for a sixth example where the second timeslot (timeslot 1) 211 is a circuit switched timeslot. In the sixth example, the first timeslot of the uplink frame 204 coincides with the fourth timeslot (timeslot 3) 213 of the downlink frame 202 and the reception-to-transmission transition occurs during the third timeslot (timeslot 2) 212 in the downlink frame 202. The lowest numbered timeslot where the access terminal will transmit during the corresponding uplink frame is the first timeslot (timeslot 0) 220. Therefore, the one timeslot greater than the lowest uplink transmission timeslot is timeslot 1 211 (B(X)+1)=timeslot 1). In accordance with the exemplary monitoring technique, the assigned PDCH timeslots are monitored up to one timeslot greater than the lowest numbered transmission timeslot. Accordingly, applying the USF monitoring technique of the exemplary embodiment, the USF is monitored in the second timeslot (timeslot 1) 211.

Figure 11:
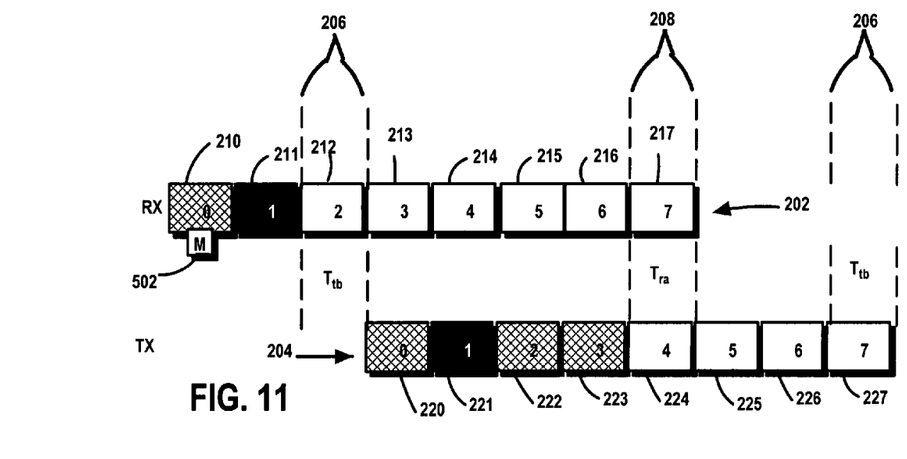
FIG. 11 is a block diagram of a uplink and downlink frames for a seventh example where the second timeslot (timeslot 1) is a circuit switched timeslot.

FIG. 11 is a block diagram of an uplink frame 204 and downlink frame 202 for a seventh example where the second timeslot (timeslot 1) 211 is a circuit switched timeslot. In the seventh example, the first timeslot of the uplink frame 204 coincides with the fourth timeslot (timeslot 3) 213 of the downlink frame 202 and the reception-to-transmission transition occurs during the third timeslot (timeslot 2) 214 in the downlink frame 202. The lowest numbered timeslot where the access terminal will transmit during the corresponding uplink frame is the first timeslot (timeslot 0) 220. One timeslot greater than the lowest uplink transmission timeslot is timeslot 1 211 (B(X)+1)=timeslot 1). In accordance with the exemplary monitoring technique the assigned PDCH timeslots are monitored up to one timeslot greater than the lowest numbered transmission timeslot unless that timeslot is a circuit switched timeslot. Since the B(X)+1 timeslot is a circuit switched timeslot, the highest downlink PDCH timeslot where the USF is monitored is the first timeslot (timeslot 0) 210. Accordingly, applying the USF monitoring technique of the exemplary embodiment, the USF is monitored in the first timeslot (timeslot 0) 210.

Figure 12:
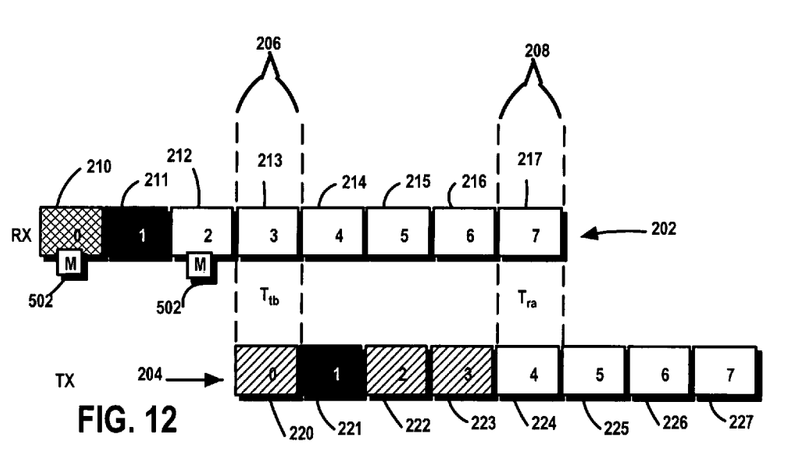
FIG. 12 is a block diagram of a uplink and downlink frames for an eighth example where the second timeslot (timeslot 1) is a circuit switched timeslot.

FIG. 12 is a block diagram of an uplink frame 204 and downlink frame 202 for an eighth example where the second timeslot (timeslot 1) 211 is a circuit switched timeslot. In the eighth example, the first timeslot of the uplink frame 204 coincides with the fourth timeslot (timeslot 3) 213 of the downlink frame 202 and the reception-to-transmission transition occurs during the fourth timeslot (timeslot 3) 213 in the downlink frame 202. The lowest numbered timeslot where the access terminal will transmit during the corresponding uplink frame 204 is the second timeslot (timeslot 1) 221. Therefore, the one timeslot greater than the lowest uplink transmission timeslot is timeslot 2 212 (B(X)+1)=timeslot 2). In accordance with the exemplary monitoring technique, the assigned PDCH timeslots are monitored up to one timeslot greater than the lowest numbered transmission timeslot. Accordingly, applying the USF monitoring technique of the exemplary embodiment, the USF is monitored in the first timeslot (timeslot 0) 210 and in the third timeslot (timeslot 2) 212.

Figure 13:
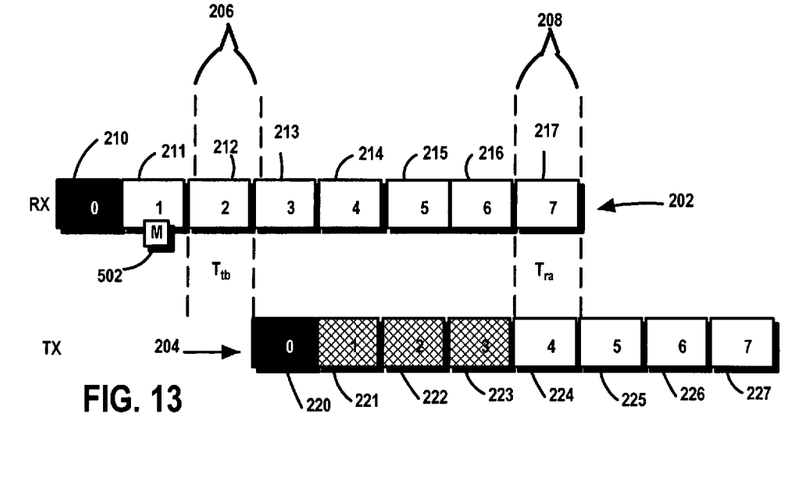
FIG. 13 is a block diagram of a uplink and downlink frames for a ninth example where the first timeslot (timeslot 0) is a circuit switched timeslot.

FIG. 13 is a block diagram of an uplink frame 204 and downlink frame 202 for a ninth example where the first timeslot (timeslot 0) 210 is a circuit switched timeslot. In the ninth example, the first timeslot of the uplink frame 204 coincides with the fourth timeslot (timeslot 3) 213 of the downlink frame 202 and the reception-to-transmission transition occurs during the third timeslot (timeslot 2) 214 in the downlink frame 202. The lowest numbered timeslot where the access terminal will transmit during the corresponding uplink frame 204 is the first timeslot (timeslot 0) 220. Therefore, the one timeslot greater than the lowest uplink transmission timeslot is timeslot 1 211 (B(X)+1)=timeslot #1). In accordance with the exemplary monitoring technique, the assigned PDCH timeslots are monitored up to one timeslot greater than the lowest numbered transmission timeslot.

Accordingly, applying the USF monitoring technique of the exemplary embodiment, the USF is monitored in the second timeslot (timeslot 1).

Figure 14:
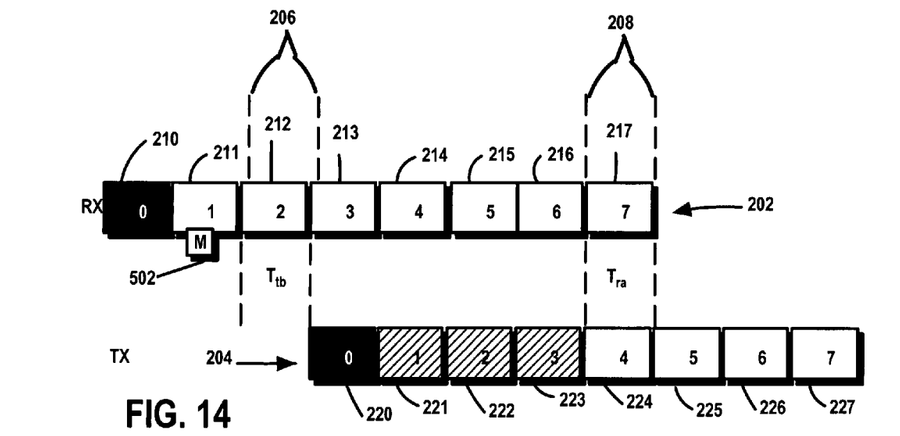
FIG. 14 is a block diagram of a uplink and downlink frames for a tenth example where the first timeslot (timeslot 0) is a circuit switched timeslot.

FIG. 14 is a block diagram of an uplink frame 204 and downlink frame 202 for a tenth example where the first timeslot (timeslot 0) 210 is a circuit switched timeslot. In the tenth example, the first timeslot of the uplink frame 204 coincides with the fourth timeslot (timeslot 3) 213 of the downlink frame 202 and the reception-to-transmission transition occurs during the third timeslot (timeslot 2) 214 in the downlink frame 202. The lowest numbered timeslot where the access terminal will transmit during the corresponding uplink frame 204 is the first timeslot (timeslot 0) 220. Therefore, the one timeslot greater than the lowest uplink transmission timeslot is timeslot 1 211 (B(X)+1)=timeslot #1). In accordance with the exemplary monitoring technique, the assigned PDCH timeslots are monitored up to one timeslot greater than the lowest numbered transmission timeslot. Accordingly, applying the USF monitoring technique of the exemplary embodiment, the USF is monitored in the second timeslot (timeslot 1).

Figure 15:
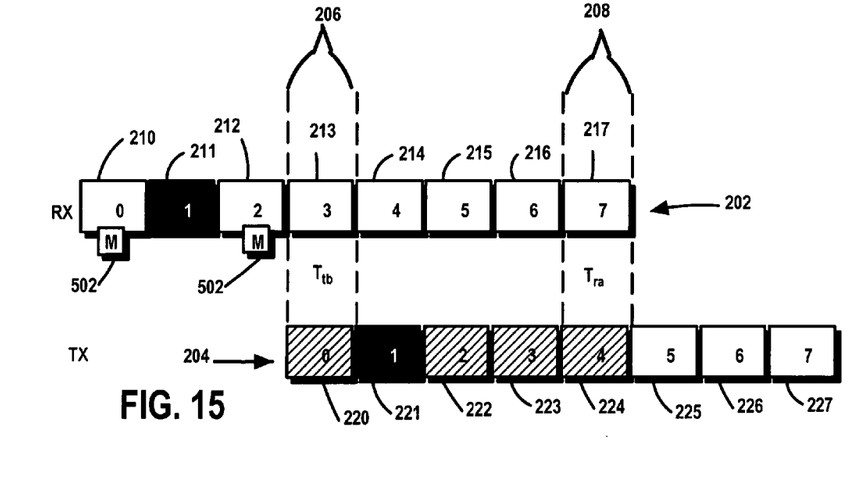
FIG. 15 is a block diagram of a uplink and downlink frames for an eleventh example where the second timeslot (timeslot 1) is a circuit switched timeslot.

FIG. 15 is a block diagram of an uplink frame 204 and downlink frame 202 for an eleventh example where the second timeslot (timeslot 1) 210 is a circuit switched timeslot. In the eleventh example, the first timeslot of the uplink frame 204 coincides with the fourth timeslot (timeslot 3) 213 of the downlink frame 202 and the reception-to-transmission transition occurs during the fourth timeslot (timeslot 3) 213 in the downlink frame 202. The lowest numbered timeslot where the access terminal will transmit during the corresponding uplink frame 204 is the second timeslot (timeslot 1) 221. Therefore, the one timeslot greater than the lowest uplink transmission timeslot is timeslot 2 212 (B(X)+1)=timeslot 2). In accordance with the exemplary monitoring technique, the assigned PDCH timeslots are monitored up to one timeslot greater than the lowest numbered transmission timeslot. Accordingly, applying the USF monitoring technique of the exemplary embodiment, the USF is monitored in the first timeslot (timeslot 0) 210 and the third timeslot (timeslot 2) 212.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for managing uplink status flags (USFs) in a communication system, the method comprising:

monitoring downlink timeslots with packet data channels (PDCHs) for USFs from a first downlink timeslot to a maximum numbered downlink timeslot numbered within a downlink time division multiple access (TDMA) frame, wherein the maximum numbered downlink timeslot is a lowest numbered transmission uplink timeslot in a corresponding uplink TDMA frame if a second lowest numbered uplink timeslot is a circuit switched timeslot and wherein the maximum numbered downlink timeslot is one timeslot greater than the lowest numbered transmission timeslot, otherwise.

2. A method in accordance with claim 1, further comprising:

determining the lowest numbered transmission uplink timeslot as a lowest numbered time slot over which an access terminal will transmit in the corresponding uplink TDMA frame.

3. A method in accordance with claim 2, further comprising:

determining whether one timeslot greater than the lowest numbered transmission timeslot is a circuit switched timeslot;

setting the maximum numbered downlink timeslot equal to one timeslot greater than a timeslot number corresponding to the lowest numbered transmission uplink timeslot if the one timeslot greater than the lowest numbered transmission timeslot is a circuit switched timeslot; and setting the maximum numbered downlink timeslot equal to another timeslot number corresponding to the lowest numbered transmission uplink timeslot if the one timeslot greater than the lowest numbered transmission timeslot is not a circuit switched timeslot.

4. A method in accordance with claim 3, wherein the monitoring comprises:
monitoring downlink timeslots to resolve conflicts within a 3GPP TS 44.060 standard.

5. An apparatus for managing uplink status flags (USFs) in a communication system, the apparatus comprising:
a PDCH USF evaluator configured to monitor downlink timeslots with packet data channels (PDCHs) for USFs from a first downlink timeslot to a maximum numbered downlink timeslot numbered within a downlink time division multiple access (TDMA) frame, wherein the maximum numbered downlink timeslot is a lowest numbered transmission uplink timeslot in a corresponding uplink TDMA frame if a second lowest numbered uplink timeslot is a circuit switched timeslot and wherein the maximum numbered downlink timeslot is one timeslot greater than the lowest numbered transmission timeslot, otherwise.

6. An apparatus in accordance with claim 5, further comprising:
an uplink timeslot analyzer configured to determine the lowest numbered transmission uplink timeslot as a lowest numbered time slot over which an access terminal will transmit in the corresponding uplink TDMA frame.

7. An apparatus in accordance with claim 6, further comprising:
a circuit switched time slot identifier configured to determine whether one timeslot greater than the lowest numbered transmission timeslot is a circuit switched timeslot; wherein the PDCH USF evaluator is further configured to:
set the maximum numbered downlink timeslot equal to one timeslot greater than a timeslot number corresponding to the lowest numbered transmission uplink timeslot if the one timeslot greater than the lowest numbered transmission timeslot is a circuit switched timeslot, and
to set the maximum numbered downlink timeslot equal to another timeslot number corresponding to the lowest numbered transmission uplink timeslot if the one timeslot greater than the lowest numbered transmission timeslot is not a circuit switched timeslot.

8. An apparatus in accordance with claim 7, wherein the apparatus monitors downlink timeslots to resolve conflicts within a 3GPP TS 44.060 standard.

9. A computer-readable medium for managing uplink status flags (USFs) in a communication system, the computer-readable medium comprising:
computer-executable logic contained on the computer-readable medium and configured for causing the following computer-executed step to occur:
monitoring downlink timeslots with packet data channels (PDCHs) for USFs from a first downlink timeslot to a maximum numbered downlink timeslot numbered within a downlink time division multiple access (TDMA) frame, wherein the maximum numbered downlink timeslot is a lowest numbered transmission uplink timeslot in a corresponding uplink TDMA frame if a second lowest numbered uplink timeslot is a circuit switched timeslot and wherein the maximum numbered downlink timeslot is one timeslot greater than the lowest numbered transmission timeslot, otherwise.

10. A computer-readable medium in accordance with claim 9, computer-executable logic contained further configured for causing the following computer-executed step to occur:
determining the lowest numbered transmission uplink timeslot as a lowest numbered time slot over which an access terminal will transmit in the corresponding uplink TDMA frame.

11. A computer-readable medium in accordance with claim 10, computer-executable logic contained further configured for causing the following computer-executed steps to occur:
determining whether one timeslot greater than the lowest numbered transmission timeslot is a circuit switched timeslot;
setting the maximum numbered downlink timeslot equal to one timeslot greater than a timeslot number corresponding to the lowest numbered transmission uplink timeslot if the one timeslot greater than the lowest numbered transmission timeslot is a circuit switched timeslot; and
setting the maximum numbered downlink timeslot equal to another timeslot number corresponding to the lowest numbered transmission uplink timeslot if the one timeslot greater than the lowest numbered transmission timeslot is not a circuit switched timeslot.

12. A computer-readable medium in accordance with claim 11, wherein the monitoring comprises:
monitoring downlink timeslots to resolve conflicts within a 3GPP TS 44.060 standard.

13. An apparatus for managing uplink status flags (USFs) in a communication system, the apparatus comprising:
a monitoring means for monitoring downlink timeslots with packet data channels (PDCHs) for USFs from a first downlink timeslot to a maximum numbered downlink timeslot numbered within a downlink time division multiple access (TDMA) frame, wherein the maximum numbered downlink timeslot is a lowest numbered transmission uplink timeslot in a corresponding uplink TDMA frame if a second lowest numbered uplink timeslot is a circuit switched timeslot and wherein the maximum numbered downlink timeslot is one timeslot greater than the lowest numbered transmission timeslot, otherwise; and
identifying means for identifying the lowest numbered transmission uplink timeslot as a lowest numbered time slot over which an access terminal will transmit in the corresponding uplink TDMA frame.

14. An apparatus in accordance with claim 13, further comprising:
a determining means for determining whether one timeslot greater than the lowest numbered transmission timeslot is a circuit switched timeslot;
wherein the monitoring means comprises:
a setting means for setting the maximum numbered downlink timeslot equal to one timeslot greater than a timeslot number corresponding to the lowest numbered transmission uplink timeslot if the one timeslot greater than the lowest numbered transmission timeslot is a circuit switched timeslot, and setting the maximum numbered downlink timeslot equal to another timeslot number corresponding to the lowest numbered transmission uplink timeslot if the one timeslot greater than the lowest numbered transmission timeslot is not a circuit switched timeslot.

15. An apparatus in accordance with claim 13, wherein the apparatus monitors downlink timeslots to resolve conflicts within a 3GPP TS 44.060 standard.

16. A method for allocating uplink resources for a mobile station, the method comprising:

monitoring downlink timeslots for uplink status flags (USFs), wherein the monitoring is performed from a first downlink timeslot to a maximum numbered downlink timeslot within a time division multiple access (TDMA) frame, wherein the maximum numbered downlink timeslot is a lowest numbered transmission uplink timeslot in a corresponding unlink TDMA frame if a second lowest numbered unlink timeslot is a circuit switched timeslot and wherein the maximum numbered downlink timeslot is one timeslot greater than the lowest numbered transmission timeslot, otherwise;

determining uplink timeslots for transmission based upon the USFs; and scheduling data for transmission on the uplink timeslots.

17. The method of claim 16, wherein the maximum downlink timeslot is determined based upon the lowest numbered timeslot over which the mobile station is going to transmit within the TDMA frame.

* * * * *